United States Patent [19]

Coggiola

[11] 4,127,342
[45] Nov. 28, 1978

[54] SLEEVED, SNAP-ON HUB-TO-SHAFT CONNECTION

[75] Inventor: Marcel Coggiola, Le Perreux, France

[73] Assignee: Robot Coupe, S.A., Rosny sous Bois, France

[21] Appl. No.: 811,433

[22] Filed: Jun. 29, 1977

[30] Foreign Application Priority Data
Jul. 12, 1976 [FR] .............................................. 7621251

[51] Int. Cl.² .............................................. F16B 21/08
[52] U.S. Cl. .................................. 403/243; 403/361; 16/121; 74/553
[58] Field of Search ............... 403/252, 254, 263, 361, 403/365, 383, DIG. 4, 243; 16/118, 121; 292/348, 349, 353; 279/96, 102; 74/553; 339/256 R

[56] References Cited

U.S. PATENT DOCUMENTS

| | | | |
|---|---|---|---|
| 2,536,445 | 1/1951 | Hoffman | 74/553 UX |
| 3,602,539 | 8/1971 | James et al. | 292/353 |
| 3,603,077 | 9/1971 | Ganter | 16/121 X |
| 3,672,708 | 6/1972 | Zemberry | 403/361 X |
| 3,769,933 | 11/1973 | Fox | 74/553 X |

FOREIGN PATENT DOCUMENTS 2008171  1/1970  France ................................. 292/349

*Primary Examiner*—Wayne L. Shedd
*Attorney, Agent, or Firm*—Parmelee, Johnson, Bollinger & Bramblett

[57] ABSTRACT

Snap-on fastener apparatus for removably holding tools on a drive shaft turned by the motor of a household electrical appliance, particularly shown as a food processor with multiple uses, in which interchangeable rotary tools of various shapes and types are employed as a function of the different food preparation tasks to be performed. A protective sheath surrounds the drive shaft and a sheath portion of the tool hub engages upon the sheath of the drive shaft. Fastener apparatus enables the user to affix the desired tool upon the drive shaft sheath in a snap-on manner for removably holding the tool against axial displacement relative to the drive shaft and enables the rapid and convenient installation or removal of the tools without the use of accessories. As the tool is being introduced onto the drive shaft, a flange spreads a plurality of elastic retainer clips which then snap back to reclose over the flange when the tool is fully installed for retaining it in position.

8 Claims, 6 Drawing Figures

SLEEVED, SNAP-ON HUB-TO-SHAFT CONNECTION

DESCRIPTION

This invention has as its goal apparatus for fixing tools on a shaft turned by a motor, particularly for household electrical appliances intended especially but exclusively for equipment known as food processors with multiple uses. Such food processors use interchangeable rotary tools of various shapes and types as a function of the different food preparation tasks to be performed. Said tools, driven by an electric motor, generally a motor with a vertical axis for turning a vertical tool-drive shaft, work tangentially in the course of their rotation. The tool-driven shaft often has a flattened section or spline face for driving the sheath portion of the hub of the tool to drive the rotary tool. The torque effort is thus transmitted entirely on the axis of the tool-drive shaft. However, in use an axial component of effort is sometimes produced raising the tool, which at best hinders the functioning of said tool.

This invention has a goal apparatus permitting one to fasten the tool on the drive shaft in a snap-on manner in such a way that it stays in place.

A second goal of the invention is an apparatus which permits rapid and convenient fitting of the respective rotary tools onto this drive shaft and removal of the tools, without the use of accessories.

According to this invention, snap-on apparatus for removable fastening of a tool includes a tool sheath engaging over a motor shaft fitted with a motor shaft sheath. The tool sheath fits over the motor shaft sheath, and the fastener apparatus is characterized in that one of the two sheaths has at least on part of its circumference a flange, the second sheath having on its circumference at least two resilient spreadable clips, the outside diameter of the flange being slightly greater than the inside clearance diameter between the retainer clips, whereby as the tool is being introduced onto the drive shaft, the flange spreads the elastic retainer clips which then snap back to reclose over the flange when the tool is fully installed for holding it against axial movement.

Other characteristics, features and advantages of the invention will appear and be explained in the course of the following description which sets forth specific modes of applying the invention as shown in the drawings. These drawings represent the following:

DETAILED DESCRIPTION

The following detailed description sets forth a number of modes of employing the present invention in practical application in food processors. The presently preferred mode is indicated in the description.

Figure 1:
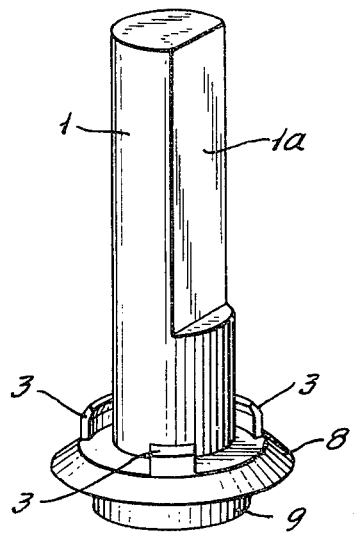
FIG. 1 is a perspective view which represents a tool-drive shaft sheath equipped with snap-on fastener apparatus according to the first embodiment of the invention.

In FIG. 1, the shaft sheath 1 on the tool-drive shaft has three small resilient retainer clips 3 which deflect elastically but snap back into shape. The shaft sheath 1 (see FIG. 3) comprises a cylindrical piece on the tool drive shaft 2 and is equipped with a flattened section or spline face 1a integrally formed with a collar 8 continued by a skirt part 9 of larger diameter than the sheath 1. It is noted that the collar 8 has an inner portion which extends radially outwardly from the shaft sheath 1 and has a peripheral sloping portion which inclines downwardly and outwardly from the radial portion of the collar. The skirt part 9 is cylindrical in configuration and extends down from the inner radial portion of the collar 8 and is located intermediate the sheath 1 and the downwardly sloping portion of the collar 8.

Figure 3:
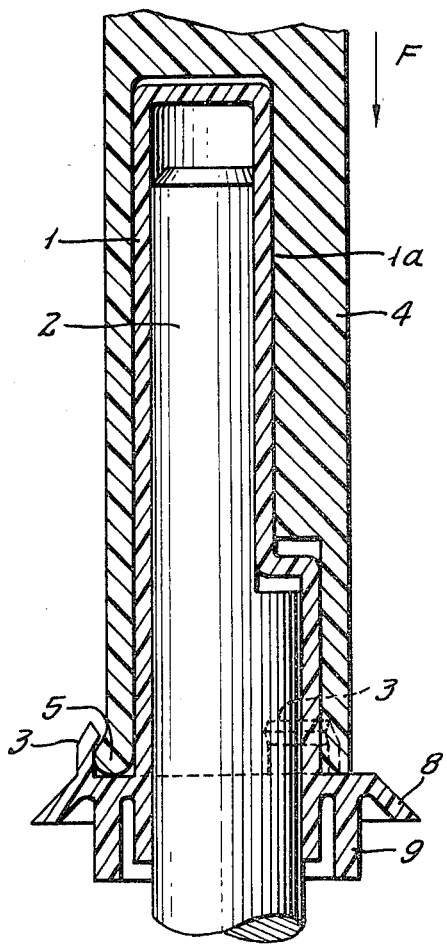
FIG. 3 is an enlarged elevational sectional view representing a drive shaft sheath such as shown in FIG. 1 and with a rotary tool sheath installed thereon.

As seen from the section shown in FIG. 3, the sheath 1, the collar 8, the depending skirt part 9, and the finger-like resilient retainer clip 3 are all integrally formed from plastic material. The clips 3 extend axially up at the juncture of the inner radial and outer sloping portions of the collar 8. Moreover, the inner surfaces of the clips at their free upper ends curve inwardly in the nature of a hook toward the axis of the drive shaft 2. Also, the top surface of each clip 3 is shown inclined inwardly and downwardly as seen in FIG. 1 and at the left in FIG. 3 for providing a cam surface which will serve momentarily to spread the clips out when the tool is being installed, as will be explained.

Figure 6:
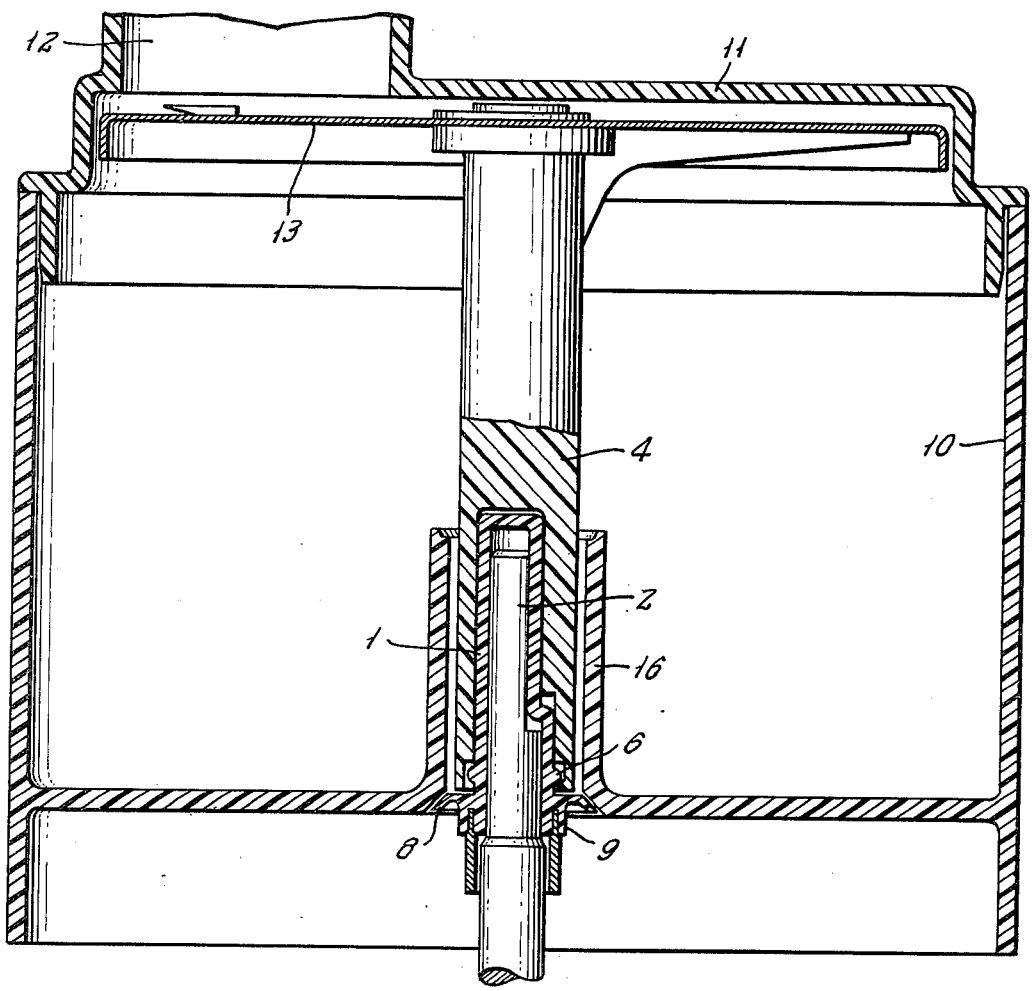
FIG. 6 is an elevational sectional view showing another tool installed on and fastened to a drive shaft by a second embodiment of the snap-on fastener means. The tool is located near the top of a bowl.

In FIG. 3, the elements already described are shown in position after the installation or mounting of the tool sheath 4 on the drive shaft sheath 1, this tool sheath 4 being shown, for example, as the lower portion of an elongated hub for a rotary tool of the type as illustrated in FIG. 6.

The tool sheath has at its bottom a flange 5 which is formed integral with the tool sheath and may go around the entire circumference of the lower end of the tool sheath 4, or may go merely part of the way around the circumference. If the flange 5 is formed to go only a part of the way around the circumference of the lower end of the sheath 4, then it includes a plurality of flange segments arranged and positioned to be engaged by the respective ones of the plurality of resilient retainer clips 3. FIG. 3 shows this arrangement in which the flange 5 extends only a part of the way around the circumference of the tool sheath 4.

As seen in FIG. 3 at the left, the periphery of the flange 5 may advantageously be rounded for providing a cam surface for cooperatively contacting against the inclined top cam surface of the resilient clips 3 for deflecting them outwardly.

Figure 2:
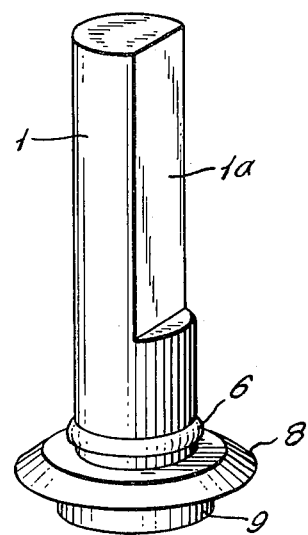
FIG. 2 being a perspective view similar to FIG. 1, represents a tool-drive shaft sheath fitted with snap-on fastener apparatus according to a second embodiment of the invention.
Figure 4:
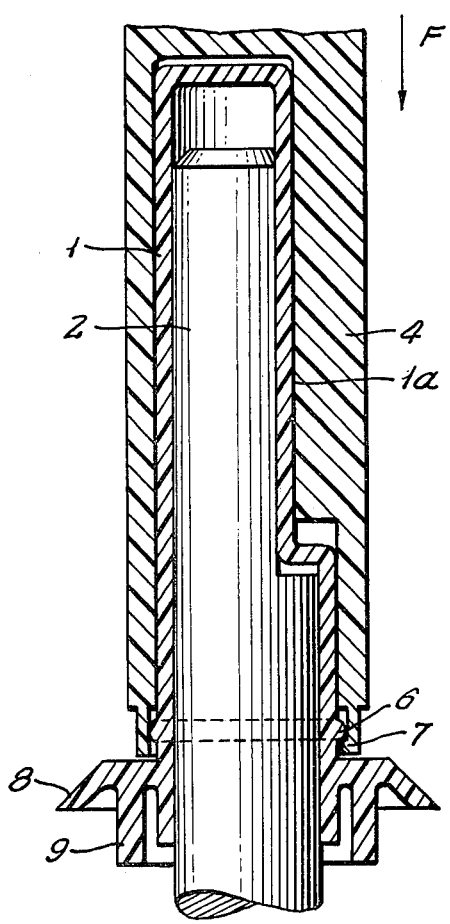
FIG. 4 is an enlarged elevational sectional view similar to FIG. 3 and representing a drive shaft sheath such as shown in FIG. 2 with a rotary tool sheath installed thereon.

The drive shaft 2, which may be formed by an extension of the motor shaft, is placed inside of the sheath 1 and has a spline surface thereon, shown in FIGS. 2 and 4 as a flattened face. When the tool sheath 4 is slid down onto the drive shaft sheath 1, as shown in FIG. 2, a resisting force is produced when the flange 5 comes into contact with the resilient snap-on clips 3. This resistance is overcome by the manual application of a slight downward force symbolized by the arrow 3. Under the influence of this applied force F, the flange 5 deflects and spreads the slips 3 by cam action and slides down between the shaft sheath 1 and the clips, and is held and retained in place during all of the operations of the tool by these clips, which resiliently snap back into their original position as shown in FIG. 3 for hooking in over the flange.

In FIG. 2 is shown the shaft sheath 1 in a second embodiment of the invention, a method of application in which the flange is on the shaft sheath and not on the slidable tool sheath. In distinction to the first embodiment, the tool sheath 4 has snap-on clips 7 on its inside, of which the inside clearance diameter is slightly less than the outside diameter of the flange 6. As shown more clearly in FIG. 4, the flange 6 may advantageously be rounded for providing a cam surface for deflecting and spreading the clips 7 outwardly when the tool is installed on the drive shaft.

As shown in FIGS. 2 and 4, the flange 6 is located on the shaft sheath 1 a slight distance above the collar 8. As seen from the section shown in FIG. 4, the sheath 1, the collar 8, the depending skirt part 9, and the flange 6 are all integrally formed from plastic material. A light downward force, as indicated by the arrow F, deflects and spreads the clips 7 which resiliently snap back to reclose around the part of the shaft sheath below the flange 6. The clips extend axially down, as seen in FIG. 4, and the inner surfaces of the clips in their free lower ends curve inwardly in the nature of a hook toward the axis of the drive shaft 2 for hooking over the flange 6.

In both cases, the removal of the tool is done in the opposite manner from the installation, that is to say, that all that is necessary is to pull up on the tool hub for the snap-on apparatus to disengage itself.

Figure 5:
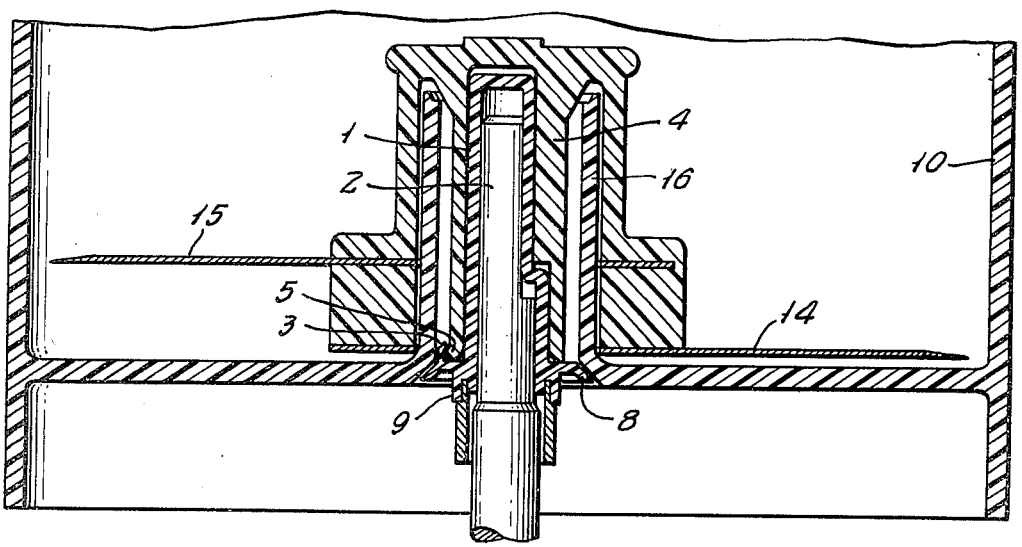
FIG. 5 is an elevational sectional view showing a slicing tool installed on and snap-on fastened to a drive shaft, the slicing tool being located in the interior of a bowl.

FIG. 5 represents a tool mounted inside a bowl 10 and fixed in place according to the first embodiment of the invention. The rotary tool represented in FIG. 5 is a cutting or chopping tool with two horizontal blades 14 and 15 which can be, for example, in a crescent form, as seen in plan view. These blades are mounted in a tool hub having an inner sheath portion 4 which fits onto the shaft sheath 1 which protects the drive shaft 2, which may be formed by an extension of the motor shaft. The tool hub includes the inner sheath 4 and revolves around an annular wall 16 which extends up from the bottom of the bowl 10 and which has as its goal assuring the water tightness of the drive shaft passage. The snap-on fastener method for the tool, shown in FIG. 5, is analogous to that represented in greater detail in FIG. 3.

Whereas, the cutting or chopping tool represented in FIG. 5 works essentially at the bottom of the bowl 10, the tool represented in FIG. 6 is composed of a disc-like blade 13 turning near the top of a bowl 10 which is closed by a cover 11, the food product to be processed being fed in through a feed tube 12. This blade 13 can be equipped or formed with different holes permitting one to shred carrots or grate cheese, for example. The method of snap-on fastening of the tool in FIG. 6 is identical to that which was represented in FIG. 4.

At present, the snap-on fastener apparatus as shown in FIGS. 1, 3 and 5, is the preferred embodiment, in which the resilient retainer clips 3 are integrally formed on the collar 8 of the drive shaft sheath 1 with the cooperating flange 5 being formed on a sheath portion 4 of the tool hub.

It is understood that modifications can be made in the embodiment of the invention which have just been described, notably by substituting equivalent technical methods without thus surpassing the spirit and scope of the invention. Though it is advantageous that the sheaths be of plastic, is evident that any other appropriate material may be used. The various embodiments of the present invention as described prevent axial movement of the installed tool and enable convenient installation and removal of the various tools by the application of the light force F without accessories.

I claim:

1. Snap-on fastener apparatus for removably fixing rotary tools onto a drive shaft, particularly for household electrical appliances, such as food processors, such appliances including a drive shaft, a shaft sheath protectively enclosing the drive shaft, and a removable rotary tool having a hub with a tool sheath slidable over said shaft sheath, said snap-on fastener apparatus comprising:
 a flange on one of said sheaths,
 a plurality of resilient, deflectable retainer clips on the other of said sheaths,
 said resilient deflectable clips having hooking surfaces,
 said flange and said resilient clips each defining a clearance diameter,
 one of said clearance diameters being an inside clearance diameter and the other being an outside clearance diameter,
 said inside clearance diameter being slightly less than said outside clearance diameter,
 whereby as the tool sheath is slid onto said drive shaft sheath said flange elastically deflects said clips which thereafter snap back in hooking relationship with respect to said flange when the tool sheath has been fully slid onto said shaft sheath,
 thereby removably holding said tool sheath against axial displacement on said shaft sheath during tool operation.

2. Snap-on fastener apparatus as claimed in claim 1, in which:
 said flange is positioned at the lower end of said tool sheath, and
 said resilient, deflectable retainer clips are positioned on said shaft sheath.

3. Snap-on fastener apparatus as claimed in claim 1, in which:
 said flange is positioned on the shaft sheath, and
 said resilient, deflectable retainer clips are positioned at the lower end of said tool sheath.

4. Snap-on fastener apparatus as claimed in claim 2, wherein said shaft sheath has a collar thereon near the lower end of said shaft sheath, in which:
 said flange is an external flange at the lower end of said tool sheath and said external flange defines said outside clearance diameter,
 said resilient, deflectable clips are positioned on said collar at a distance outwardly from said shaft sheath, and the free ends of said clips extend toward the upper end of said shaft sheath,
 said hooking surface on said clips hook inwardly toward the axis of rotation of said shaft sheath and said clips define said inside clearance diameter slightly less than said outside clearance diameter, whereby as the tool sheath is slid onto the shaft sheath the clips are spread outwardly and snap back for reclosing around said flange when the tool sheath is fully installed.

5. In a household electrical appliance such as a food processor, such appliance including a drive shaft having a spline surface thereon, a shaft sheath protectively enclosing the drive shaft and having a spline surface such as a flat face thereon, a collar on said shaft sheath near the lower end thereof, and a removable rotary tool having a hub with a tool sheath slidble over said shaft sheath for engaging said shaft sheath in torque-transmitting relationship for turning said rotary tool, snap-on fastener apparatus for removably holding the tool against axial displacement along said shaft sheath comprising:

a plurality of resilient retainer clips mounted on said collar and extending from said collar toward the end of said shaft sheath on to which said tool sheath is slidable, said retainer clips having hooking surfaces near their free ends which hook inward toward the axis of roation of said shaft sheath, said retainer clips defining an inside clearance diameter, said tool sheath having an external flange near the end thereof which is slid onto said shaft sheath, said external flange defining an outside diameter which is slightly larger than said inside clearance diameter, whereby as the tool sheath is slid onto the shaft sheath the clips are spread outwardly and snap back for reclosing around said flange when the tool sheath is fully installed, thereby removably holding said tool sheath against axial displacement on said shaft sheath during tool operation.

6. In a household electrical appliance as claimed in claim 5 and wherein said collar has an inner portion extending radially from the shaft sheath and an outer sloping portion which inclines outwardly from said inner portion in a direction away from the end of said shaft sheath onto which said tool sheath is slidable, snap-on fastener apparatus for removably holding the tool against axial displacement with respect to the shaft sheath in which:

said resilient clips are integrally formed with said collar and extend from the juncture between said inner radial collar portion and said outer sloping collar portion.

7. In a household electrical appliance as claimed in claim 5, snap-on fastener apparatus for removably holding the tool against axial displacement, in which:

the free ends of said clips have sloping cam surfaces which incline inwardly in a direction away from the end of said shaft sheath onto which said tool sheath is slidable for deflecting and spreading the ends of said resilient clips as said flange enters between said clips.

8. In a household electrical appliance as claimed in claim 6, snap-on fastener apparatus for removably holding the tool against axial dispacement with respect to the shaft sheath, in which:

said shaft sheath, said collar and said resilient clips are integrally formed from plastic material and said tool sheath and flange are integrally formed from plastic material for use in a food processor for ease of cleaning after operation of the tool for food preparation.

* * * * *